(12) United States Patent
Boillot et al.

(10) Patent No.: US 7,847,787 B1
(45) Date of Patent: Dec. 7, 2010

(54) METHOD AND SYSTEM FOR DIRECTING A CONTROL ACTION

(75) Inventors: Marc Boillot, Plantation, FL (US); Jason McIntosh, Sugar Hills, GA (US)

(73) Assignee: NaviSense, Plantation, FL (US)

( * ) Notice: Subject to any disclaimer, the term of this patent is extended or adjusted under 35 U.S.C. 154(b) by 912 days.

(21) Appl. No.: 11/559,295

(22) Filed: Nov. 13, 2006

Related U.S. Application Data (60) Provisional application No. 60/735,327, filed on Nov. 12, 2005.

(51) Int. Cl.
*G09G 5/00* (2006.01)
(52) U.S. Cl. .................................................. 345/156
(58) Field of Classification Search ......... 345/156–182; 178/18.01–19.05
See application file for complete search history.

(56) References Cited

U.S. PATENT DOCUMENTS

| | | | |
|---|---|---|---|
| 5,274,363 A | 12/1993 | Koved | |
| 5,509,114 A * | 4/1996 | Moran et al. | ................. 345/443 |
| 6,130,663 A | 10/2000 | Null | |
| 6,313,825 B1 | 11/2001 | Gilbert | |
| 6,937,227 B2 | 8/2005 | Qamhiyah | |
| 7,078,911 B2 | 7/2006 | Cehelnik | |
| 7,081,884 B2 | 7/2006 | Kong | |
| 7,092,109 B2 | 8/2006 | Satoh | |
| 7,130,754 B2 | 10/2006 | Satoh | |
| 2005/0179646 A1* | 8/2005 | Lin et al. | ..................... 345/156 |
| 2006/0238490 A1* | 10/2006 | Stanley et al. | ............... 345/156 |

FOREIGN PATENT DOCUMENTS

JP 2004303000 A * 10/2004

\* cited by examiner

*Primary Examiner*—Sumati Lefkowitz
*Assistant Examiner*—Rodney Amadiz
(74) *Attorney, Agent, or Firm*—Marc Boillot

(57) ABSTRACT

A system (100) and method (200) is provided for directing a control action. The method includes the steps of detecting a first movement (202), capturing a first profile corresponding to the first movement (204), comparing the first profile with a second profile, the second profile corresponding to a second movement (206), and activating a user interface behavior (208) if the first profile and the second profile are substantially similar.

10 Claims, 5 Drawing Sheets

METHOD AND SYSTEM FOR DIRECTING A CONTROL ACTION

CROSS-REFERENCE TO RELATED APPLICATION

This application claims the benefit and filing date of Provisional Application No. 60/735,327 entitled "Method and System for Directing a Control Action" filed Nov. 12, 2005.

BACKGROUND

1. Field

The present embodiments of the invention generally relates to the field of communication accessory devices, and more particularly to user interfaces.

2. Description of the Related Art

Motion sensing devices can detect movement. Motion detection systems can include radar systems, video camera monitoring systems, outdoor lighting systems, and medical diagnostic systems. Motion detection systems generally include a sensor which converts a physical signal into an electronic signal. The sensor performs the task of capturing the signal and converting it to a suitable format for processing. A motion detection system can include a processor for interpreting the sensory information and identifying whether an object has moved.

SUMMARY

Broadly stated, embodiments of the invention concern a method and system for directing an action using touchless sensing. The system can include a sensing unit for detecting a first touchless movement and capturing a first profile corresponding to the first touchless movement, a processor communicatively coupled to the sensing unit for comparing the first profile with a second profile, the second profile corresponding to a second touchless movement, and a controller communicatively coupled to the device for activating a behavior if the first profile and the second profile are substantially similar. For example, the behavior can cause at least one action on an object. The system can further include a memory for saving at least one profile, and a clock for limiting a time window between the comparing of the first profile and the comparing of the second profile. A time for activating the behavior can be limited by the time window.

One embodiment of the invention concerns a method for directing an object action. The method can include detecting a first movement, capturing a first profile corresponding to the first movement, comparing the first profile with a second profile, the second profile corresponding to a second movement, and activating a user interface behavior if the first profile and the second profile are substantially similar. For example, a movement is at least one of a continuous touchless movement, an accelerated touchless movement, a graduated touchless movement, or a touchless stop movement. The user interface behavior can cause at least one action on the object such as a single click, a double click, a scroll, and a hold. In one arrangement the object can be a cursor or a user interface component. At least one action on a cursor can activate a user interface behavior at a location of the cursor corresponding to the first movement. In one arrangement at least one of a plurality of profiles corresponding to movements can be captured between the capturing of the first profile and the second profile. The capturing of a plurality of profiles can provide a tracking path which can be traced backwards.

Embodiments of the invention also concern a machine readable storage, having stored thereon a computer program having a plurality of code sections executable by a portable computing device for causing the portable computing device to perform the steps of detecting a first movement, capturing a first profile corresponding to the first movement, comparing the first profile with a second profile, the second profile corresponding to a second movement, and activating a user interface behavior if the first profile and the second profile are substantially similar.

BRIEF DESCRIPTION OF THE DRAWINGS

The features of the present invention, which are believed to be novel, are set forth with particularity in the appended claims. The invention, together with further objects and advantages thereof, may best be understood by reference to the following description, taken in conjunction with the accompanying drawings, in the several figures of which like reference numerals identify like elements, and in which:

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Broadly stated, embodiments of the invention are directed to a method and system for directing a control action via touchless sensing. The system can include a sensing unit for detecting a first touchless movement and capturing a first profile corresponding to the first touchless movement, a processor communicate coupled to the sensing unit for comparing the first profile with a second profile, the second profile corresponding to a second touchless movement, and a controller communicatively coupled to the device for activating a user interface behavior if the first profile and the second profile are substantially similar. For example, the user interface behavior can cause at least one action on an object. The system can further include a memory for saving at least one profile, and a clock for limiting a time window between the comparing of the first profile and the comparing of the second profile. For example, a time of activating the user interface behavior is limited by the time window.

One embodiment is directed to a method for directing a cursor using touchless sensing, comprising the steps of detecting a first finger movement to produce a first information, detecting a second finger movement to produce a second information, and producing a cursor coordinate from a combination of the first information and second information. A user interface object can be activated in view of the cursor coordinate. Upon detecting a second finger movement, a location of the cursor along a path the cursor travels between the first movement and second movement can be identified. The path can include the location of the first movement and location of the second movement. As an example, a user may use a first finger to navigate a cursor, and a second finger to direct a control on an object of the cursor. An object of the cursor may be a user interface component in a display, such as a menu list or button. The movement of the second finger constitutes a concerted movement to activate a control behavior on the object. For example, the user may navigate the cursor to a minimize button in a window, and issue a second finger movement to minimize the window.

In another arrangement, a single finger can be used to navigate a cursor object, and direct a control on an object of the cursor. For example, a user may use a first touchless finger movement to position a cursor over an object in a display. The user can then perform a quick touchless finger movement to direct a control on the object. For example, the user may navigate the cursor to a minimize button in a window, and issue a brief finger movement to minimize the window using the same finger. The system also concerns a method for controlling a cursor including the steps of moving a first finger on a first hand, moving a second finger on a second hand, and activating a user interface behavior at a location of the cursor corresponding to the first movement.

The operative aspects of the embodiments of the invention are further described herein primarily in the context of controlling a cursor using an ultrasonic sensor device. It will be apparent to one of ordinary skill, however, that other sensor devices such as optical, camera, or laser devices can provide touchless sensing. The method of directing a control action is not limited to the type of sensor device. That is, other embodiments, such as laser scanning or optical scanning can be similarly employed for providing touchless sensing. In such regard, the methods of directing a control as herein described can be applied for touchless sensing. Moreover, the methods of directing a control are not limited to a keyboard and computer. The methods can apply to handheld devices such as a mobile phone, a portable music player, a security device, a kiosk, or any other user interface system. The method can also apply equally well in other contexts, besides cursor control, such as joystick control, gaming, text processing, text messaging, typing, and other input related tasks where control of an action is necessary. Moreover, a cursor does not need to be visually present for directing a control. For example, object components within a display can be selected in accordance with the methods of directing a control action herein.

Figure 1:
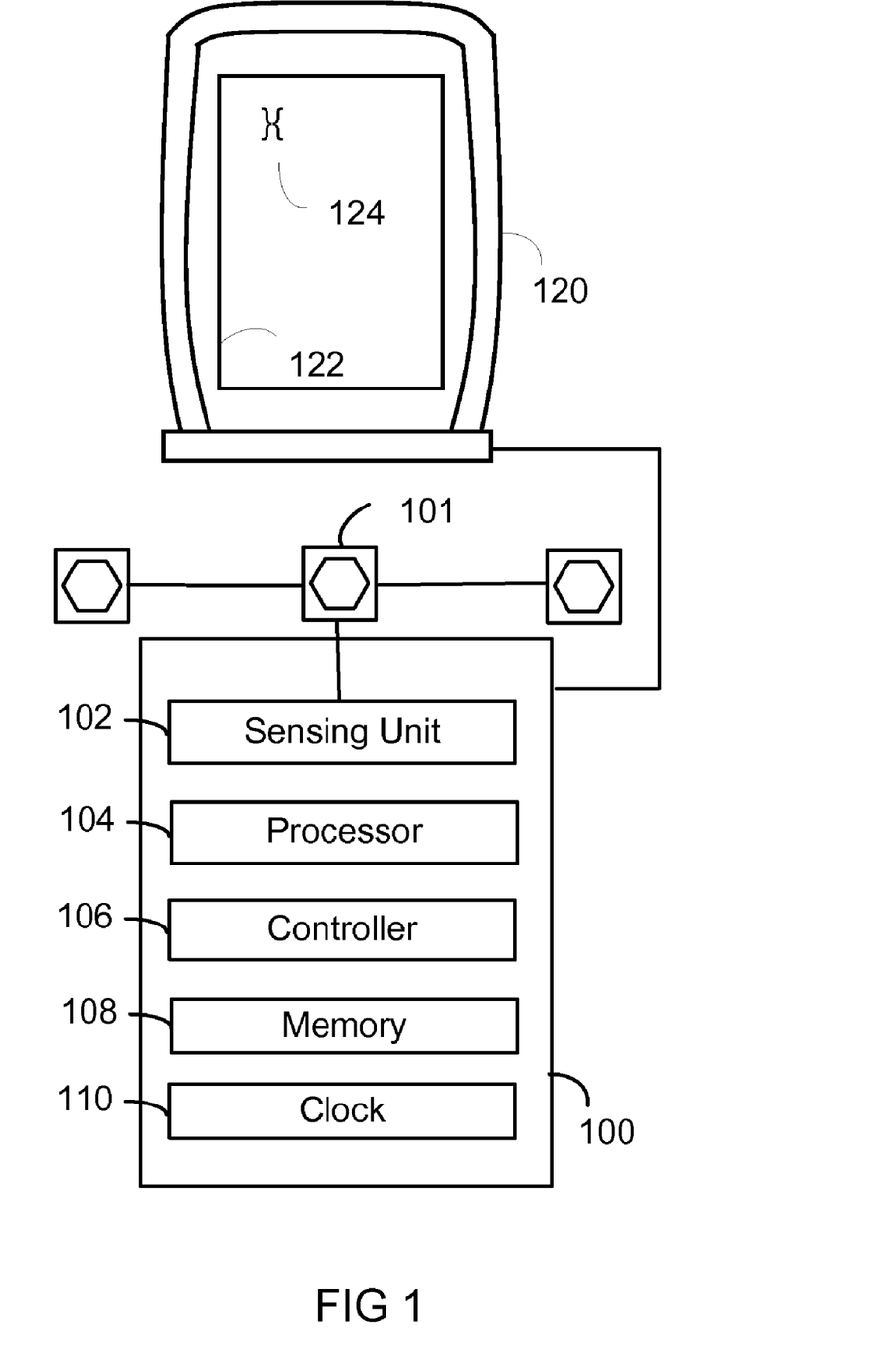
FIG. 1 is a block diagram of a system for directing a user interface action in accordance with an embodiment of the inventive arrangements.

Referring to FIG. 1, a system 100 for directing a cursor 124 on a display 122 of a host device 120 is shown. The system 100 can include a sensing unit 102, a processor 104, a controller 106, a memory 108 and a clock 110. The system 100 is not limited to these components nor to having all these components. Moreover, the system is not limited to controlling a cursor. As another example, an object in a display, such as a menu list, can be controlled via touchless sensing. The system 100 can be a single device such as a single-chip solution, a system-on-a-chip solution, a custom ASIC, an EPROM, an FPGA, a DSP, or microcontroller, but is not limited to these devices. The sensing unit 102 can include a sensor 101 that detects signals. In one arrangement, the sensor 101 can be an ultrasonic transducer, an acoustic speaker, a CMOS light imager, an optical sensor, a light sensor capable of converting a physical media to an electric signal such as a voltage or current, but is not limited to these.

Briefly, the sensor 102 can detect touchless movement of an object, such as a hand or finger, within the vicinity of the sensor 101. In one embodiment the sensor 101 is at least one ultrasonic sensor which transmits and receives ultrasonic signals. The sensor can determine a location and movement of the finger based on principles of echo location. Briefly, the sensor 101 can transmit an ultrasonic signal and wait for a reflection. If an object is present it can reflect the signal. The sensor unit 102 can receive the reflection signals. The processor 104 can be coupled to the sensor unit 102 for estimating a time of flight measurement from timing measurements between the transmitted and reflection signals captured by the sensor unit 102 to determine the location of the object. The processor 104 can also estimate other properties of the received signal to estimate object attributes in addition to object displacement. For example, certain objects have absorptive properties which will change the signal characteristics. Also the location of the object will change the reflected signal properties.

As one example, the system 100 can sense finger motion and convert finger motion into coordinate locations that can be input to a computer for moving a cursor. The cursor can be used to carry touchless movement information, such as coordinate information, to an object in a display of the computer or to perform an action on a component in a display of the computer. The coordinate information can be input to a computer to control or navigate a cursor around a display. The user can raise a finger above a keyboard and the touchless user interface can sense the finger motion. The computer may also be a handheld device with or without a visual cursor.

The sensor unit 120 and the controller can both have access to the memory 108. The controller can also be coupled to the clock 110 for determining when signals should be captured and processed. The clock 110 can perform timing measurements for determining the amount of time expired between signals associated with a first touchless movement and a second touchless movement. The processor 104 can capture signal characteristics within a profile that can be saved to the memory 108. Alternatively, a reflected signal in its entirety or in partial decomposition can be saved to memory 108 as a profile. The controller 106 can inquire the clock 110 for determining when profiles in memory 110 should be compared. The clock 110 can limit a time window between the comparing of the first profile and the comparing of the second profile, where the time of activating the user interface behavior is limited by the time window. For example, the controller 104 can compare the first profile with a second profile, where the second profile can correspond to a second movement, and if the first profile and the second profile are substantially similar, the controller 106 can cause at least one action on the cursor. The action on the cursor can be within the time limit specified by the time window.

The processor 104 can be cooperatively connected to a controller 106 for controlling a cursor object on a host 120. For example, the host 120 can be a computer that has a display 122. The host 120 can control the cursor 124 on the display 122. The host 120 can also receive input from an external device to control the cursor 124. For example, the system 100 can supply user interface coordinate information to the PS2 input and USB input of a computer host 120. The host 120 can relinquish control to the system 100 for controlling the cursor 124. The host 120 may also be a mobile device that can receive touchless commands for directing a control on one or more objects handled by the mobile device. The objects may be graphical user interface components on a display of the mobile device, or media controls. Briefly, the controller 106 can determine a second movement for activating a user interface behavior at the location of the cursor occurring at the first movement.

In one aspect, the system 100 considers a touchless movement to signify the user desiring to take control of the cursor. For example, during normal typing the system 100 can detect finger motion or hand motion and move the cursor on the screen in response. During typing, cursor movement can be sporadic since the fingers are typing instead of navigating the cursor. The user may not simply move the finger away from the location they want the cursor to stay because the touchless user interface will follow their movement. The touchless user interface follows movement and moves the cursor in accordance with the movement. The touchless user interface is a sensory based tracking device without actuating controls or mechanism. As an example, in gaming, a user can control a cursor and perform an action depending on the location of the cursor. A sensing system for gaming can benefit from sensory based control logic which activates the buttons during the game.

Figure 2:
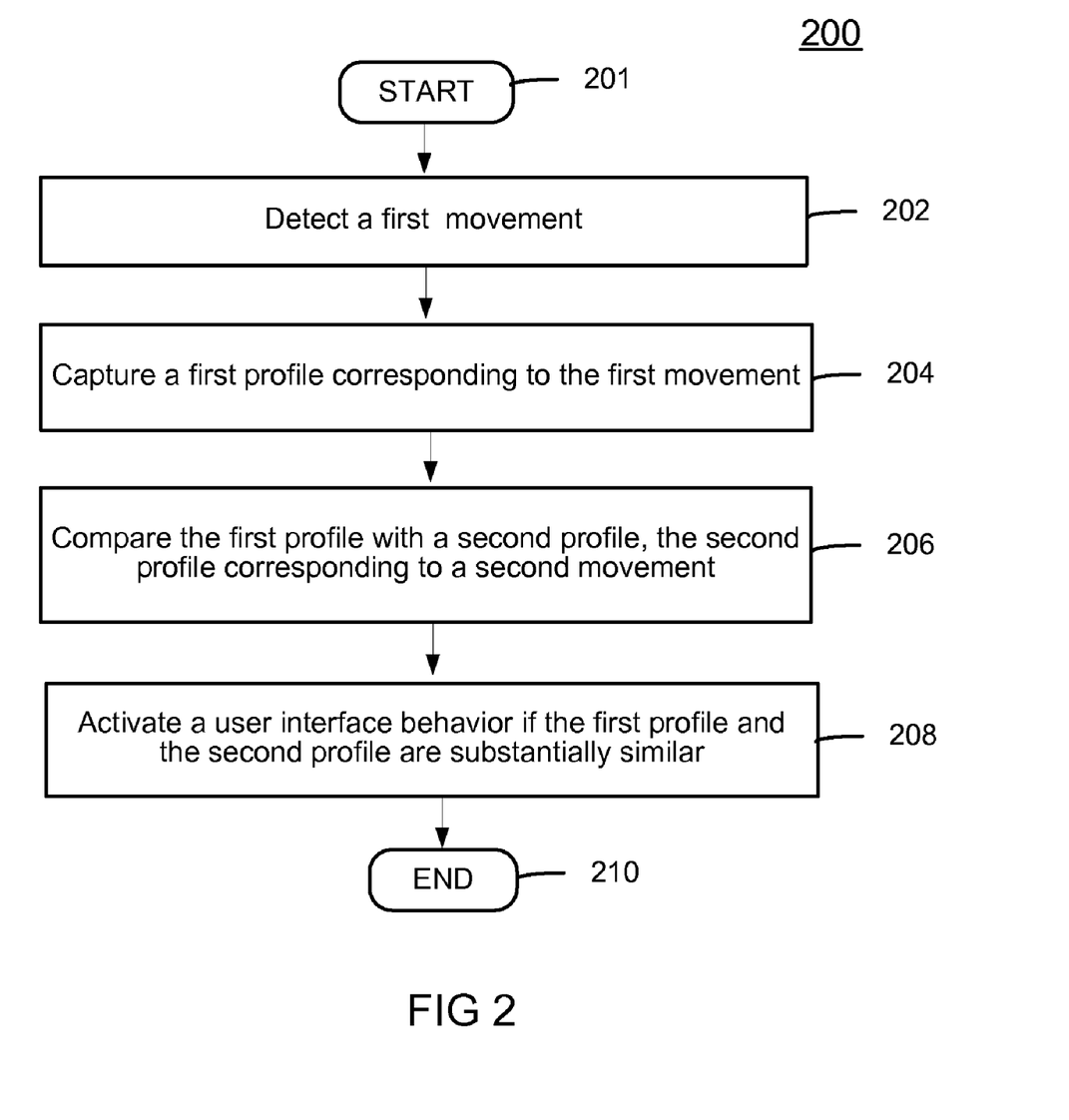
FIG. 2 is a method for directing a user interface action in accordance with an embodiment of the inventive arrangements.

Referring to FIG. 2, a method 200 for directing a cursor 124 on a display 122 of a host device 120 is shown. Briefly, the method 200 allow a user to move a control a cursor based on finger movement controls. In particular, a user can direct a control action on an object. When describing the method 200, reference will be made to FIG. 1, although it must be noted that the method 200 can be practiced in any other suitable system or device. Moreover, the steps of the method 200 are not limited to the particular order in which they are presented in FIG. 2. The inventive method can also have a greater number of steps or a fewer number of steps than those shown in FIG. 2. In one example a user can use at least two fingers to control a user interface behavior on a cursor. The movement of the fingers can represent a concerted effort to control the cursor and direct an action on the cursor. In another example, a user can use one finger to navigate and control a cursor.

At step 201, the method can start. At step 202 a first movement can be detected. For example, a user can move a finger for directing a cursor. At step 204, a first profile corresponding to the first movement can be captured. For example, the first movement can be the time at which a finger begins movement from a rest position, the first movement occurring at the begin time. Accordingly, the first movement can be the time at which a finger in motion comes to rest, the first movement occurring at the rest time. For example, the rest time can be the time at which a finger in motion stops. At step 206, the first profile can be compared to a second profile, where the profile corresponds to a second movement. For example, the second movement can be similar in behavior to the first movement. Accordingly, the second movement can be the time at which a second finger moves from a rest position and returns to the rest position, where the time of the second movement corresponds to the time at which the second finger after moving comes to rest. At step 208, a user interface behavior can be activated if the first profile and the second profile are substantially similar. For example, the user interface behavior can cause at least one action on the cursor, or an object handled by the cursor. An action may be a selection entry, a scroll, a single click, or a double click, as example. An object handled by a cursor may be a graphical user interface component, or a menu item, as example. For instance, The first finger movement can cause detection of a first movement and the second finger movement can cause detection of a second movement for activating a user interface behavior at a location of the cursor when the first movement was detected.

Figure 3:
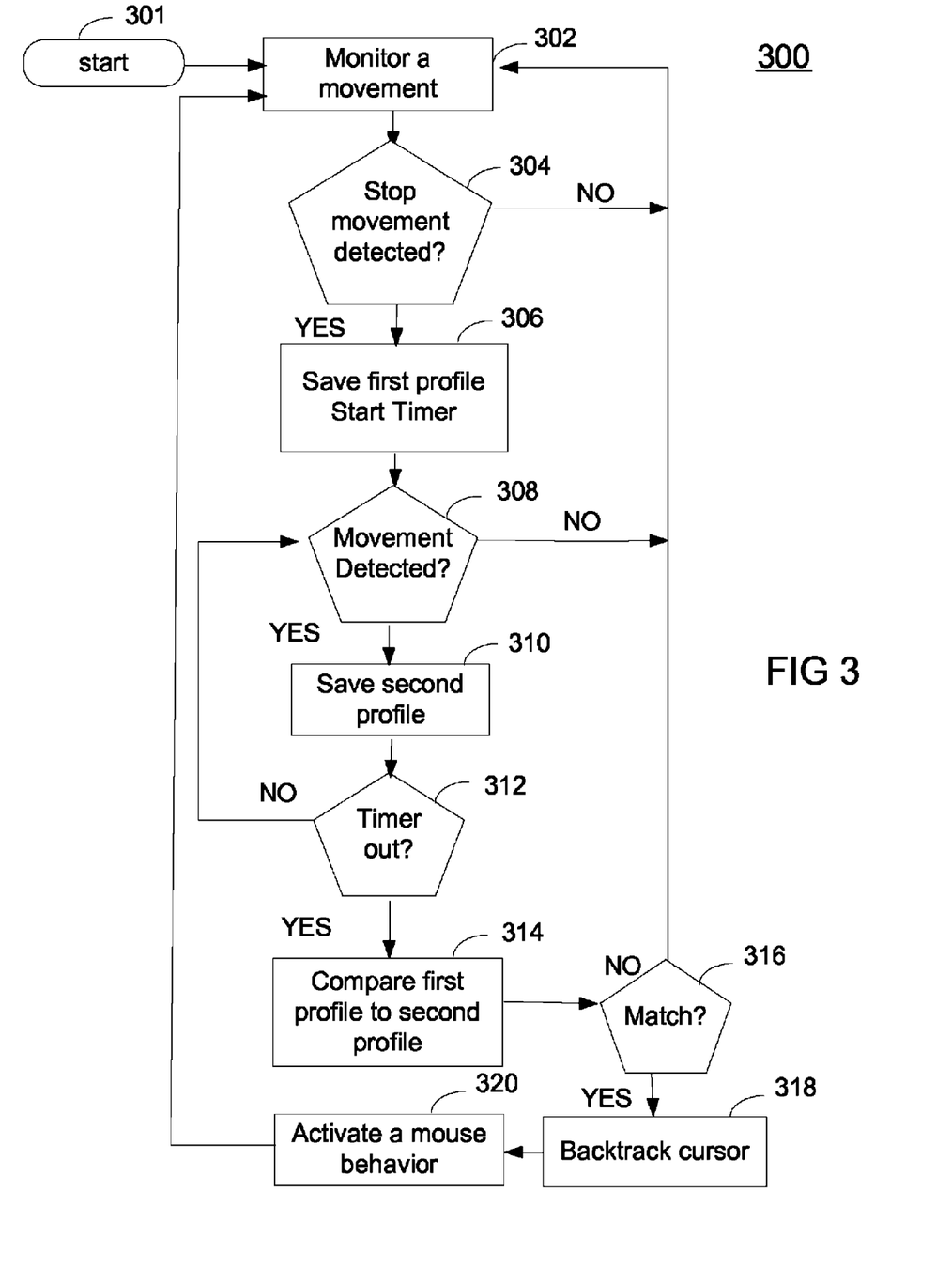
FIG. 3 is a flowchart for directing a user interface action in accordance with an embodiment of the inventive arrangements.
Figure 4:
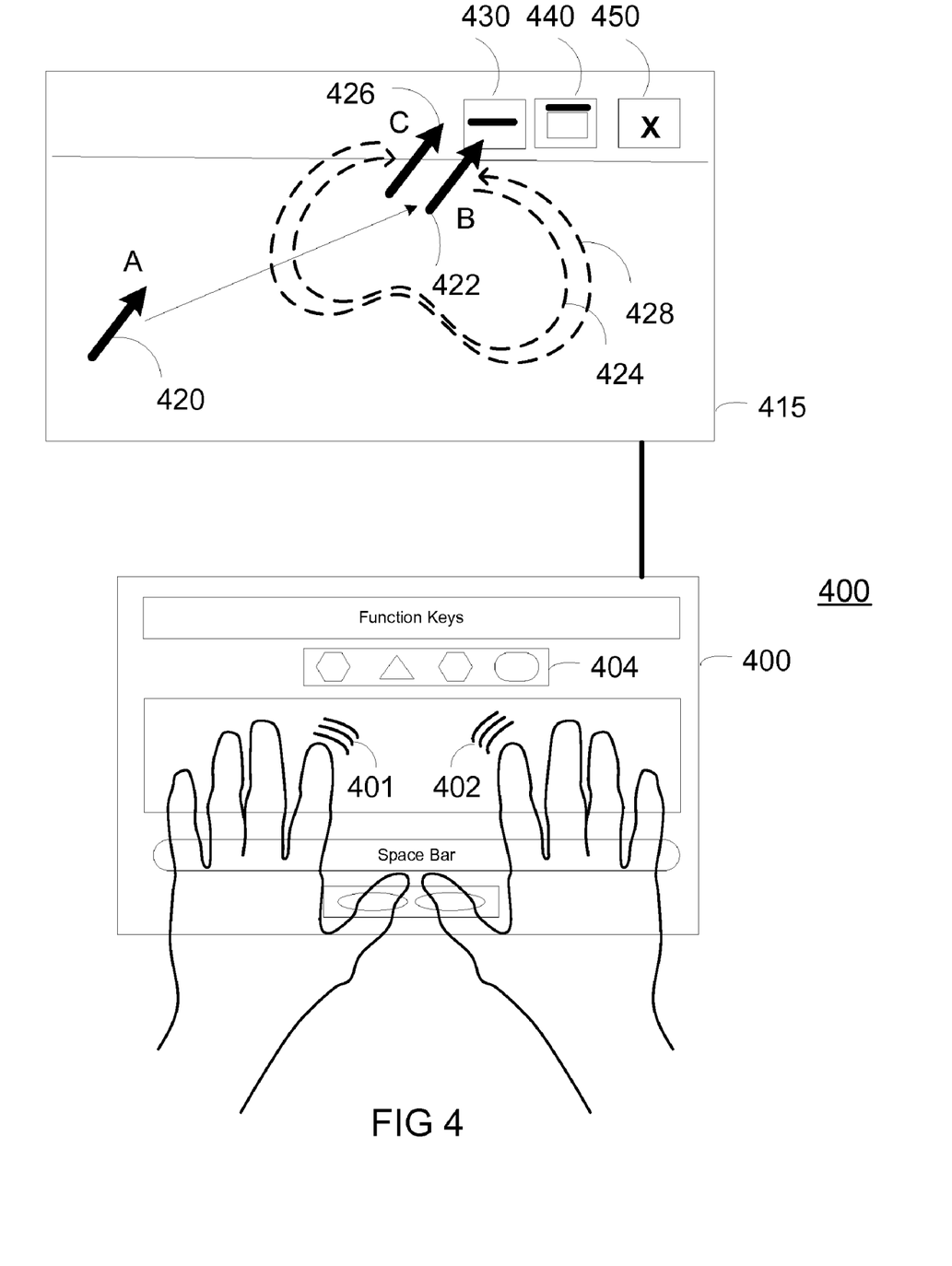
FIG. 4 is a pictorial example for directing a user interface action in accordance with an embodiment of the inventive arrangements.

Referring to FIG. 3, a method 300 of directing a cursor 124 on a display 122 of a host device 120 in accordance with the steps of method 200 is shown. The host device 120 can be a computer display or a mobile device display. The method 300 provides a practical example of the control logic carried out by the method 300. Reference will be made to FIG. 1 and FIG. 4. for describing the example. For instance, referring to FIG. 1 and FIG. 4, a user is typing 400 by moving their hands and fingers which causes the cursor to move in the screen. The processor 104 can estimate properties of a coherent signal received by the sensor 101 at the sensing unit 102, and detect that there is non-coherent motion. Non-coherent implies that the user is not applying a concerted effort in directing or controlling a cursor. At step 301 the example can start. The user has stopped typing and the fingers remain in typing position or in another stationary position. For example, the user could pause their hand and finger movement, so the processor 104 would not detect movement. At step 302, the system 100 can monitor a movement. Referring to FIG. 4, the user can raise a first finger 451 on a first hand and begins to move the finger for controlling the cursor 124. The cursor moves in accordance with the motion of the first finger. The user can perform a specific task by controlling the user interface. For example, the user moves the cursor 420-422 using right finger control to a window 415 containing a set of window option tools in a direction 420-422 to minimize 430, maximize 440, or close the window 450.

At step 304, the processor 104 can determine whether movement is detected. The movement can be a continuous movement, or a stop motion which is a continuous finger movement followed by a stop. For example, for a stop motion, reflected signals would not change and would not deviate if the hands or fingers did not move. If the processor 104 does detect a first movement, it proceeds at step 306 to save a first profile and start a timer. If the processor 104 does not detect movement, the processor 104 and sensing unit 102 resume to monitoring movement. Accordingly, the processor 104 detects coherence in the signals since the signals can produce similar responses, or have consistent attributes, across time. As time passes, if there is no movement, signals captured by the sensing unit 102 do not change over time. The processor 104 can use one of an autocorrelation technique, a differential technique, and a pattern matching approach, to determine that the signals are stationary, yet coherent.

In one arrangement, the sensing unit can capture at least one of a plurality of profiles corresponding to touchless movements between the capturing of the first profile and the second profile. The sensing unit can save at least one of the plurality of profiles to the memory. For example, the sensing unit can capture at least one of a continuous touchless movement, an accelerated touchless movement, a graduated touchless movement, and a stop touchless movement. A profile can include coordinate information for controlling the object, where the coordinate information can include at least one of a relative displacement, a time of flight measurement, a zero crossing, an amplitude, and an actual position of the object. In one arrangement, the sensing device can be an ultrasonic device, an optical device, an infrared device, or a laser. In one arrangement, the user interface behavior includes at least one of a single click, a double click, a scroll, a left click, a middle click, a right click, and a hold.

For example, the user moved the cursor 420 using right finger control 402 to a window 415 containing a set of window option tools and positioned the cursor 422 over the intended option tool 430. The user performed a first movement (a stop motion) and now keeps the right finger steady to keep the cursor over the intended tool 430. The stop motion signifies that an action is to be directed on the cursor. Otherwise, if the finger continued movement, the sensing unit 102 would detect movement and move the cursor. Upon the detection of a first movement, the processor 104 saves a first profile corresponding to the first movement and calculates the current coordinates of the user interface. For example, when the fist finger is the right finger, and it is stationary, the sensor 101 signal responses, which are also still, together provide a unique profile that is characteristic of the finger position as 'seen' by a sensor 101 at that moment in time, i.e. the first movement. At this step, 304 the system captures the unique profile and saves it in memory. In the meanwhile, the right finger remains at the current position to keep the cursor 422 over the intended tool 430, called the overtool location.

Shortly thereafter, the user can raise a second finger 401, i.e. the left finger. The sensing unit 102 can sense this movement and move the cursor in accordance with the left finger 401 movement. The cursor can move to a position other than the overtool location across a path 424, which is not desirous, i.e., the cursor has moved away from the overtool location 430 to some other position 426 due to the second finger 401 movement. Shortly thereafter, in accordance with the control method provided by the embodiments of this invention, the user can move the left finger 401 back to its original location and invoke a stop motion, all the while causing the cursor to move around. The movement can retrace the path of the second movement 428 or some other path. For example, the path will be similar if the second movement is symmetric over time. At the end of the stop motion, the cursor may or may not be in vicinity the overtool location 426 for activating a user interface behavior on the overtool location. At this point, the left finger has ceased movement and the right finger still remains were it was at the detection of the first movement. The controller 106 saves a second profile corresponding to the second movement.

At step 308, the system 100 recognizes that a second movement has begun after the first movement (first stop motion). The controller 106 starts recording the relative displacements of any forthcoming (future) finger movements, i.e. any profiles after the first movement (stop motion). The processor calculates relative displacements for each forthcoming profile. The controller 106 buffers all these relative displacements sent to the computer in a memory queue, occurring, after the first movement At the loop set by 308 to 312, the controller 106 saves off the relative displacements that are sent to the computer to control the cursor for each movement detected at step 308. At step 310, the processor 104 saves a second profile corresponding to a stop motion, i.e. the second movement. The processor 104 compares the first profile captured at the first movement (first stop motion) with the second profile occurring at the second movement (second stop motion). Because the hand and finger placements are similar to the positions at the time of the first movement, the first and second profile will be similar. The processor 104 determines if the profiles are similar for a determining if a recurrent condition exists.

At step 312, a clock checks to determine the amount of time elapsed between the detection of the first movement and the second movement. If the amount of time expired is greater than a threshold, the controller 106 does not direct a user interface behavior on the cursor. If the amount of time expired is less than a threshold, the controller 106 determines that the second movement was a directed action to perform a user interface action on the cursor. For example, the threshold can be 0.5 seconds for an average time signaling mechanism. It should be noted that the controller 106 can change the threshold to accommodate the action speed at which users want to move their fingers. Certain users may prefer a quick reaction time, or a slower reaction time. Any second movements greater than the time window do not cause a user interface action to be performed on the cursor. The clock 110 performs the timer functions and estimates the amount of time elapsed between movements for directing the cursor. If the elapsed time is less that the threshold the processor 104 resumes detecting for a movement. If the elapsed time is more that the threshold, at step 316, the processor 104 performs a comparison action to determine if the conditions are the same as they were before the second movement.

In one aspect, the first and second profile further includes coordinate information for controlling the cursor. For example, the coordinate information comprises at least one of a relative displacement, a time of flight measurement, an amplitude, and an actual position of the cursor. This coordinate information can describe the position of the cursor along a path occurring between the first movement and second movement. In one arrangement, at least one profile is a response captured by a sensing device where the response from the device can an ultrasonic signal, an optical image, a laser, or an infrared signal. The method can further include saving at least one profile to a memory, and limiting a time window between the comparing of the first profile and the comparing of the second profile. For example, a time of activating the user interface behavior between the first movement and the second movement is limited by the time window.

At step 316, if the first profile and second profile are substantially similar a matching condition is met and the controller 106 traces back all the relative displacements it incurred between the first cease-time and the second-cease time. The controller 106 does so by querying the saved-off buffer in memory 108 which contains all the relative displacements sent to the computer. The controller 106 sends the relative displacements in reverse order that they were received and with opposite sign. The system effectively, traces back the positional displacements sent to the computer, and moves the cursor back to the exact same position the cursor was at when the first movement occurred. While the right and left finger are still, no movement detected by the sensing unit 102, though the user sees the cursor rapidly tracing back along the path described from all movement after the first cease time.

In another aspect, the cursor, or an object handled by the cursor, can exhibit an acknowledgement behavior when a movement is detected, where the acknowledgement behavior is a visual cue to the user that a movement has been detected. For example, the acknowledgement behavior can be a flashing cursor effect, a color change of the cursor, a fade of the cursor, a morphing of the cursor, or a spin of the cursor, but is not limited to these. Accordingly, the acknowledgement behavior can be a sensory or haptic signal which tells the user through a physical experience that the action has been recognized. Similarly, the host device of the cursor can produce an acknowledgement behavior when a movement is detected, where the acknowledgement behavior is a visual cue to the user that a movement has been detected. For example, the host can be a computer that presents a pop up message or a screen change, though not limited to these.

At step 318, the controller 106 can backtrack the cursor. For example, at least one action on the cursor backtracks the movement of the cursor from a current location to a previous location, wherein the current location is the location of the cursor corresponding to the second movement, the previous location is the location of the cursor corresponding to the first movement. Accordingly, the activating a user interface behavior can occur at a location of the cursor corresponding to the first movement. For example, the user can move a first finger to move the cursor, stop the finger to stop the cursor, move a second finger to move the cursor, stop the second finger, and the cursor can return to the position at the location of the first stop, where a user interface behavior can be applied to the location of the cursor at the first position. As another example, the activating a user interface behavior can occur at a location on at least at one point along the back track of the cursor.

At step 320, the cursor 426 has returned 422 to the overtool location 430 and the system 100 issues an enter command or any other user interface command to the user interface input of the host computer 120. In support, FIG. 5 illustrates the method steps of the method 300.

It should be noted that the system 100 is not limited to the dual finger operation described, which is one exemplary embodiment. In another embodiment, a first finger alone can be used to move a cursor and activate a behavior. Referring to FIG. 4, a user can position the first finger 402 over the toolbar 430. The controller 106 can acquire a first profile that corresponds to a first stop movement associated with the finger stopping at the toolbar 430. To select the toolbar, the user can briefly move the finger away and then back to the toolbar 430. In this example, the user may move the finger along the path 424. In practice, almost any path that leaves and returns to the toolbar can be considered. Again, the clock 110 may impose a timer wherein the user should return the finger to the toolbar 430 to signify that an action on the toolbar is desired. When the user returns the finger to the toolbar, the controller 106 can identify a second stop movement at the toolbar 430. In particular, the controller 106 can capture a second profile and determine that the second profile captured at the second stop, is similar to the first profile captured at the first stop. In such regard, the user can perform touchless sensing and control with a single finger. For example, a user can navigate to an open window using a first finger, and then close the widow by briefly moving the first finger away and back to the minimize toolbar 430.

Figure 5:
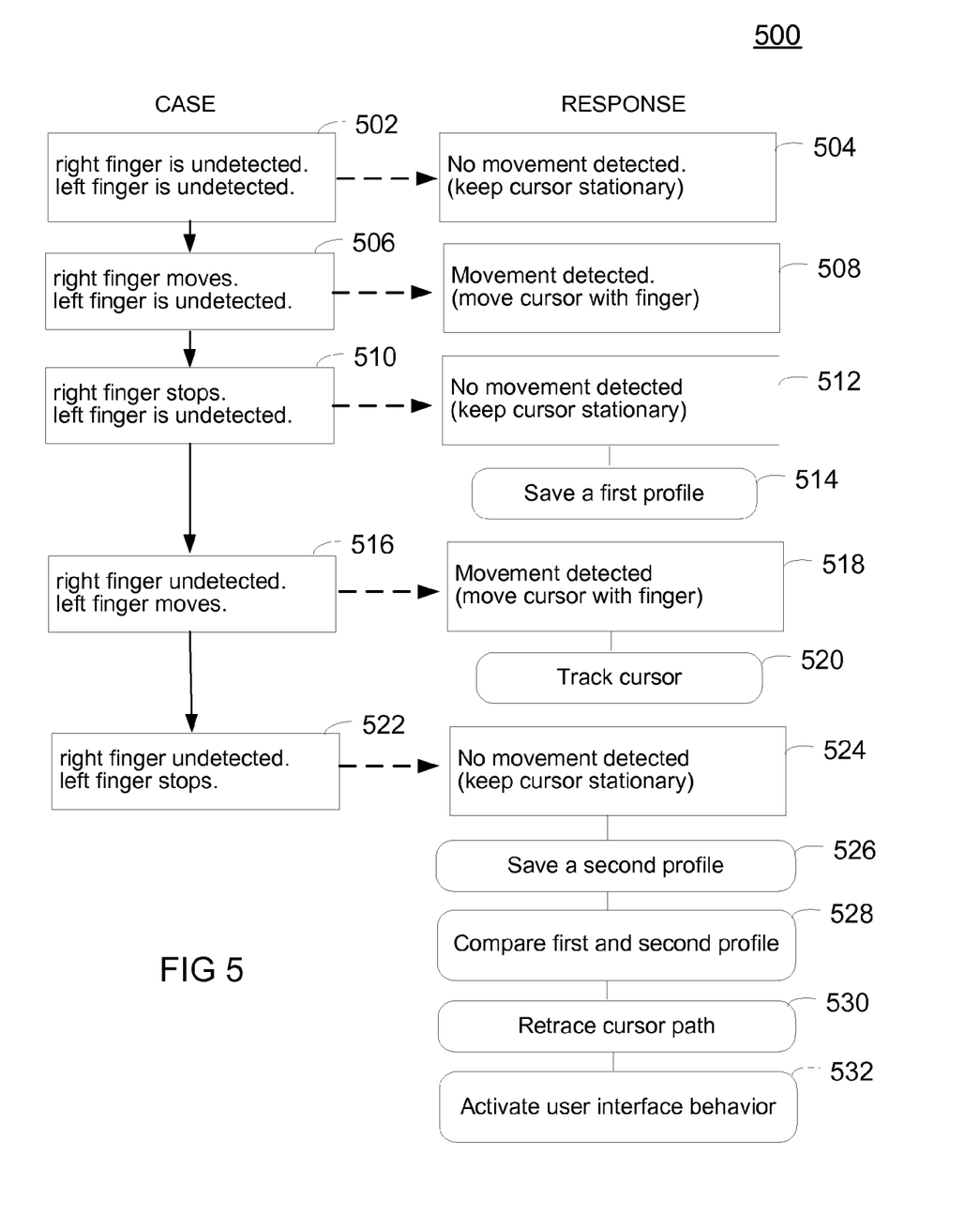
FIG. 5 is an example flowchart for directing a user interface action in accordance with an embodiment of the inventive arrangements.

Referring to FIG. 5, one example 500 for touchless navigation and control is presented. The example 500 includes cases and responses for summarizing one embodiment of the method 200. Notably, the number of cases and responses may be fewer or more than those shown, and is not limited to those presented. It should also be noted that the example 500 is directed to dual finger use; that is, a first finger on a first hand is used for navigation, and a second finger on a second hand is used for control. It should be noted again, that a first finger alone can perform touchless navigation and control in accordance with the method 200 of the invention; that is, a first finger can perform touchless navigation, and the same first finger can be used to direct and action by issuing a brief departing and returning movement.

The example 500 can start in a state wherein a user is at a keyboard with both hands typing as shown in FIG. 4. At step 502, the user can keep both hand still. Accordingly, at step 504, the controller 106 will not detect movement and keep the cursor stationary. At step 506, the user may move the right finger to control a cursor while keeping the left finger still. Accordingly, at step 508 the controller 106 will detect movement and move the cursor in accordance with the finger movement. At step 510, the user may stop the right finger, for example, at a location such as toolbar 430 (See FIG. 4). The left hand is also stationary. Accordingly, the controller 106 will detect no movement and keep the cursor still. The controller 106 can also save a profile at this location. At step 516, the user may move the left finger, for example, to signify a control action such as minimizing a window since the cursor is over the toolbar 430 (See FIG. 4). Accordingly, at step 518, the controller 106 can identify movement and track the cursor. At step 522, the user may stop the left finger. The stopping of the left finger signifies the end of the left finger movement. In this case, the stopping of the left finger directs a control to minimize the window. Accordingly, at step 524, the controller detects nor further movement, and at step 526 saves a second profile. At step 528, the controller 106 compares the first profile with the second profile. At step 530, the controller 106 can retrace the cursor path to determine the location to direct the control. In this example, the control is to minimize the toolbar 430. Accordingly, the controller 106 issues a single click at the first location corresponding to the first profile and the location of the toolbar 430, and the window closes. Notably, the step of retracing the cursor path 530 is to determine where the location of the cursor was at the first location.

The system also includes a time expiration for limiting the amount of time between a first movement and a second movement. The time expiration limits the number of relative displacements that will be saved-off to the buffer. The buffer store sufficient relative displacements and is limited in memory. For example, M profiles representing the relative displacement can be saved off every 10 ms, and over a 50 ms window, 5M profiles would be saved. In one example, the time expiration can be set at 50 ms which means the user would be required to raise and lower the left finger within 50 ms. If the user does not move the left finger within this time limit, no profiles stored in memory will match because the buffer has only limited data for comparison. For instance, at time 0 ms the profile A is stored and over the course of 50 ms the following single profiles are stored: ABCDCBA. Each profile letter is representative of a finger position at a unique location. There are 7 profiles and the finger has indeed moved from A to D, and back to A again. However, the buffer only stores 5 profiles (ABCDC) and the system cannot determine that the finger has returned to its original location. The system can employ a modulo pipeline buffer using a Last-in First-out (LIFO) technique. Profiles are saved to memory and raised in address space each time a new profile is stored until they fall out of the buffer when the buffer length is reached.

The system can be robust to false detections. For example, a false detection can be when the system incorrectly matches the second profile with the first profile. To note, each finger location has an associated profile that is unique to that location. Each response profile produces a unique pair of coordinates. This produces a one to one mapping of finger locations to coordinate positions. For example, at the first cease time the right finger can be at coordinate x1,y1. At the second cease time the right finger can be at coordinate x1+dx, y1+dy. The system defines a proximal region used during matching that is a function of the displacement, f(dx,dy). For example, the second movement coordinates within the profile region of the first movement. Accordingly, if the coordinate at the second cease time (x2,y2) are outside of the proximal region (x2>x1+dx) and (y2>y1+dy), the system will not trace back the relative displacements. The system recognizes that the right finger has moved from a first position to a second position and will not attempt to retrace relative displacements and issue a user interface behavior, or click action command.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A system for directing a touchless action, comprising
   a sensing unit for controlling a cursor responsive to tracking a first touchless movement of a finger directing the cursor to an object visually displayed at a first location in a user interface and capturing a first profile corresponding to the first touchless movement at the first location;
   a processor communicatively coupled to the sensing unit for comparing the first profile with a second profile captured during touchless tracking to a second location of the user interface and back to the first location, the second profile corresponding to a second touchless movement directing the cursor away and back again to the first location;
   a clock for limiting a time window between the comparing of the first profile and the comparing of the second profile, and
   a controller communicatively coupled to the device for activating a behavior on the object at the first location when the first profile and the second profile are substantially similar and occurring within the time window
   wherein at least one action on the object backtracks a movement of the cursor from a current location to a previous location, wherein the current location is the location of the cursor corresponding to the second touchless movement, the previous location is the location of the object corresponding to the first touchless movement.

2. The system of claim 1, further comprising:
   a memory for saving at least one profile; and
   wherein a time of activating the behavior is limited by the time window.

3. The system of claim 1, wherein the sensing unit captures at least one of a plurality of profiles corresponding to movements between the capturing of the first profile and the second profile, and saves at least one of the plurality of profiles to the memory.

4. The system of claim 1, wherein the sensing unit identifies at least one of a continuous touchless movement, an accelerated touchless movement, a graduated touchless movement, and a stop touchless movement.

5. The system of claim 1, wherein at least one profile further includes coordinate information comprising at least one of a relative displacement, a time of flight measurement, a zero crossing, an amplitude, or an actual position of the object.

6. The system of claim 1, wherein the sensing device comprises at least one of an ultrasonic device, an optical device, an infrared device, and a laser.

7. The system of claim 1, wherein the behavior constitutes a user interface behavior for directing a control, which comprises at least one of a single click, a double click, a scroll, a left click, a middle click, a right click, or a hold.

8. The system of claim 1, wherein the activating corresponds to a user interface behavior that occurs at a location corresponding to the first touchless movement.

9. The system of claim 1, wherein the object exhibits an acknowledgement behavior when a movement is detected that is a visual cue.

10. The system of claim 9, wherein the acknowledgement behavior is one of at least a flashing object effect, a color change of the object, a fade of the object, a morphing of the object, and a spin of the object.

* * * * *